June 24, 1924.　　　　　　　　　　　　　　　　　　　1,498,711
P. R. YEAZEL
RESILIENT TIRE
Filed May 29, 1922　　　　　2 Sheets-Sheet 1

Paul R. Yeazel, Inventor

By Staley Bowman, Attorneys

June 24, 1924.
P. R. YEAZEL
RESILIENT TIRE
Filed May 29, 1922  2 Sheets-Sheet 2
1,498,711
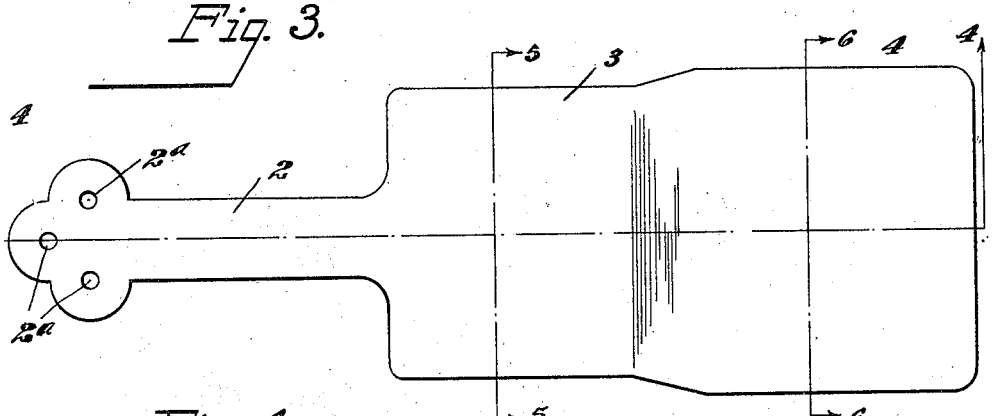
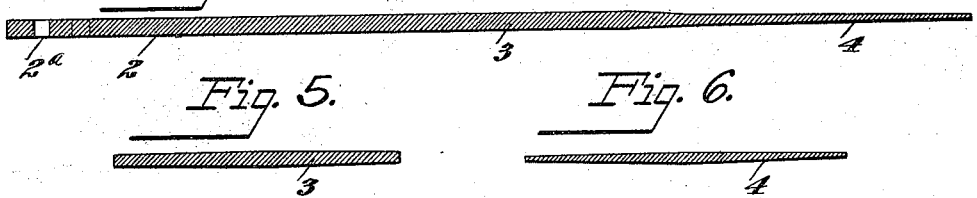
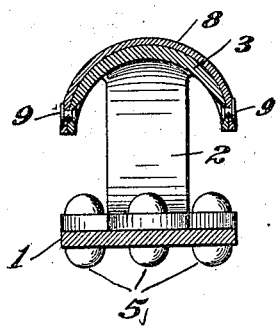 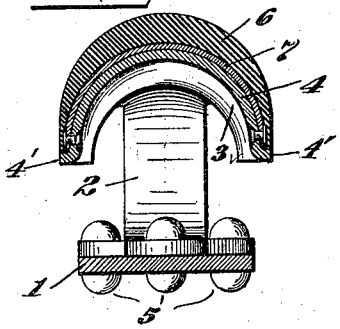
Inventor
Paul R. Yeazel
By Staley T. Bowman
Attorneys Patented June 24, 1924.

1,498,711

UNITED STATES PATENT OFFICE.

PAUL R. YEAZEL, OF SPRINGFIELD, OHIO.

RESILIENT TIRE.

Application filed May 29, 1922. Serial No. 564,283.

*To all whom it may concern:*

Be it known that I, PAUL R. YEAZEL, a citizen of the United States, residing at Springfield, in the county of Clark and State of Ohio, have invented certain new and useful Improvements in Resilient Tires, of which the following is a specification.

My invention relates to improvements in resilient tires for the wheels of motor vehicles, it particularly relating to that type of resilient tire which employs a series of metallic springs as the resilient elements.

An object of the invention is to simplify and increase the efficiency of tires of this character.

A further object of the invention is to provide an arrangement of resilient springs so constructed as to permit adjacent springs to overlap in an effective manner and thereby reinforce each other to resist load and shock.

A further object of the invention is to provide an arrangement of wear shoes for the springs which will be efficient to resist road wear and of a nature to facilitate assembling of the parts.

Further objects will appear from the following description and claims.

In the accompanying drawings:

Fig. 3 is a plan view of a blank from which one of the resilient elements is formed.

Fig. 4 is a section of the blank on the line 4—4 of Fig. 3.

Fig. 5 is a section of the blank on the line 5—5 of Fig. 3.

Fig. 6 is a section of the blank on the line 6—6 of Fig. 3.

Fig. 7 is a section on the line 7—7 of Fig. 2.

Fig. 8 is a section on the line 8—8 of Fig. 2.

Figure 1:
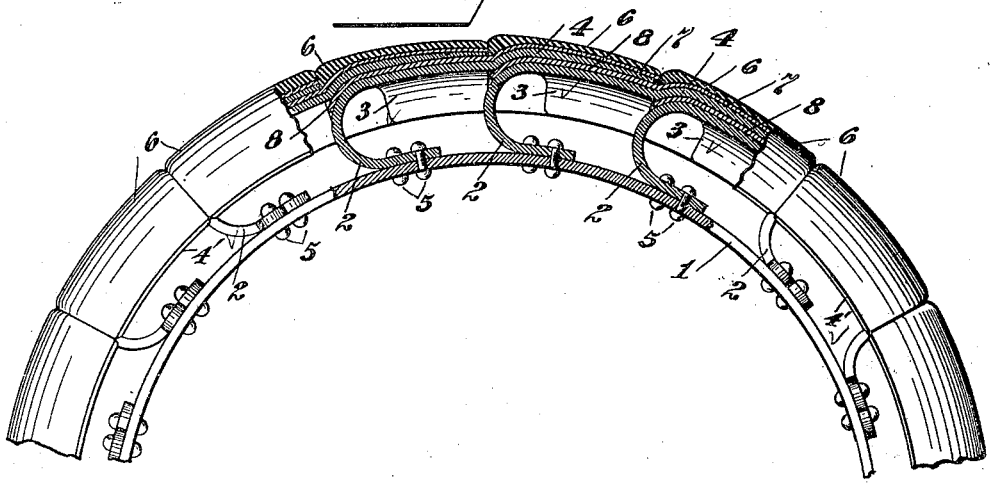
Fig. 1 is a side elevation partly in section of a portion of a resilient tire embodying the improvements.
Figure 2:
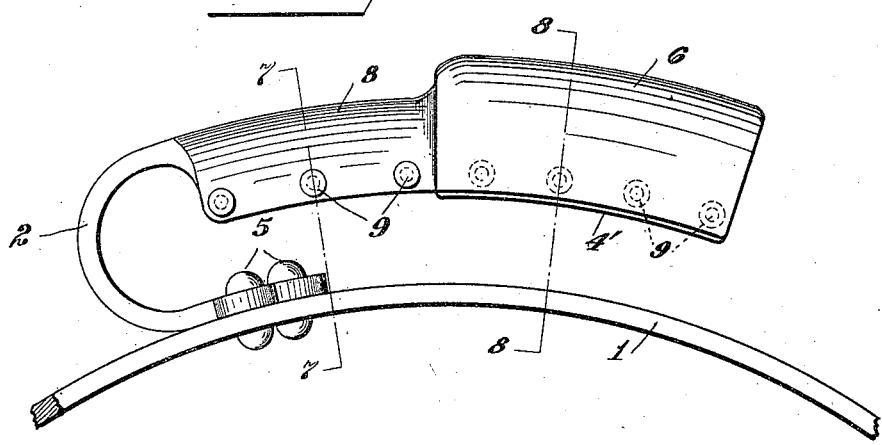
Fig. 2 is a side elevation of a portion of the tire rim and one of the resilient elements and its wear shoe.

Referring to the drawings, 1 represents the rim in the form of a flat metallic ring of a nature which will permit the tire to be placed upon the usual felly of a motor vehicle wheel and be secured thereon by the usual removable clamping devices. Secured to the outer periphery of this rim is a series of resilient elements in the form of metallic springs. Each of these springs in the present case is shown as constructed from a blank such as shown in Fig. 3 which may be stamped or otherwise formed to provide a comparatively narrow curved spring arm 2, an intermediate portion 3 and an outer end portion 4. Each of the portions 3 and 4 is formed in a longitudinal direction on the arc of a circle whose center is at the axis of the wheel, and also formed arcuately in a transverse direction, the portion 4 being of larger cross-sectional dimensions than the part 3. As shown in Figs. 4, 5 and 6 the metal forming the portion 4 is tapered toward its free end and both portions 3 and 4 are tapered transversely toward their side edges. The spring arm 2 has its end provided with a series of apertures 2ª to receive rivets 5 by which it may be secured to the rim 2. These spring elements project peripherally in the same direction and are so disposed on the rim 1 as to cause the enlarged portion 4 to overlap the smaller intermediate portion 3 of the adjacent element, the dimensions of the respective portions 3 and 4 being such as to cause the part 4 to snugly fit the part 3 when in overlapped relation therewith.

Secured to the part 4 of each resilient member is a tread or wear shoe shown in the present case as constructed of vulcanized rubber 6 and fabric 7 in the well known way of forming pneumatic tire casings. The fabric, however, is extended, as indicated at 8 to form a flap to cover the intermediate portion 3 of the resilient element, and the shoe as well as its fabric extension are secured to the metal of the spring element by rivets 9. As shown in Fig. 8 the side edges of the portion 4 are bent laterally to form lips 4' to protect the side edges of the shoe.

When the parts are assembled it will be noticed that the fabric extension 8 lies between the part 3 of one spring element and the overlapping portion of the adjacent element to eliminate wear between those parts, provide a noiseless structure and prevent the entrance of dirt. The rubber portions 6 are arranged with their adjacent ends in close proximity, so that the displacement of the rubber of those sections which are under load will tightly close the space between the adjacent sections and thereby eliminate the possibility of dirt finding its way between the same.

By the arrangement of the spring elements, it will be seen that each element is reinforced by the next adjacent element so that the load and road shock will be distributed throughout a plurality of the elements.

While I have shown the spring elements as constructed of an integral blank of sheet metal, if desired, the spring elements may be formed of separate parts welded or otherwise securely fastened together. The shoes may also be constructed of leather or other flexible material which will furnish a good wearing surface.

Having thus described my invention, I claim:

1. In a resilient tire, the combination, with a rim, of a series of spring elements each secured rigidly at one end of said rim, each of said elements extending circumferentially in the same direction in spaced relation to said rim with the outer free end portion of each element overlapping for a substantial distance an intermediate portion of the next adjacent element, the overlapping portions being curved in a circumferential direction and also transversely.

2. In a resilient tire, the combination, with a rim, of a series of spring elements, each of said elements consisting of a curved arm secured to said rim and intermediate and outer portions arranged in stepped relation, said intermediate and outer portions being formed on curved lines both circumferentially and transversely, the said outer end portion of each element being of larger cross-sectional area than the intermediate portion, said outer end portion being arranged to overlap the intermediate portion of the next adjacent spring element.

3. In a resilient tire, the combination, with a rim, of a series of spring elements, each of said elements consisting of a curved arm secured to said rim, and an intermediate and outer end portion arranged in stepped relation with each other, said intermediate and outer end portions being formed on curved lines both circumferentially and transversely, with the outer end portion of the greater cross-sectional area and adapted to overlap the intermediate portion of the adjacent element, and a protecting covering secured to the outer end portion of each element, said protecting covering having a flap arranged to lie between the overlapping parts.

4. In a resilient tire, the combination, with a rim, of a series of spring elements, each of said elements consisting of a substantially U-shaped arm secured rigidly at one end to said rim and being extended in a circumferential direction at the other end with the extended portion of the arm overlapping the peripherally extended portion of an adjacent element.

In testimony whereof, I have hereunto set my hand this 26th day of May, 1922.

PAUL R. YEAZEL.